Patented May 11, 1937

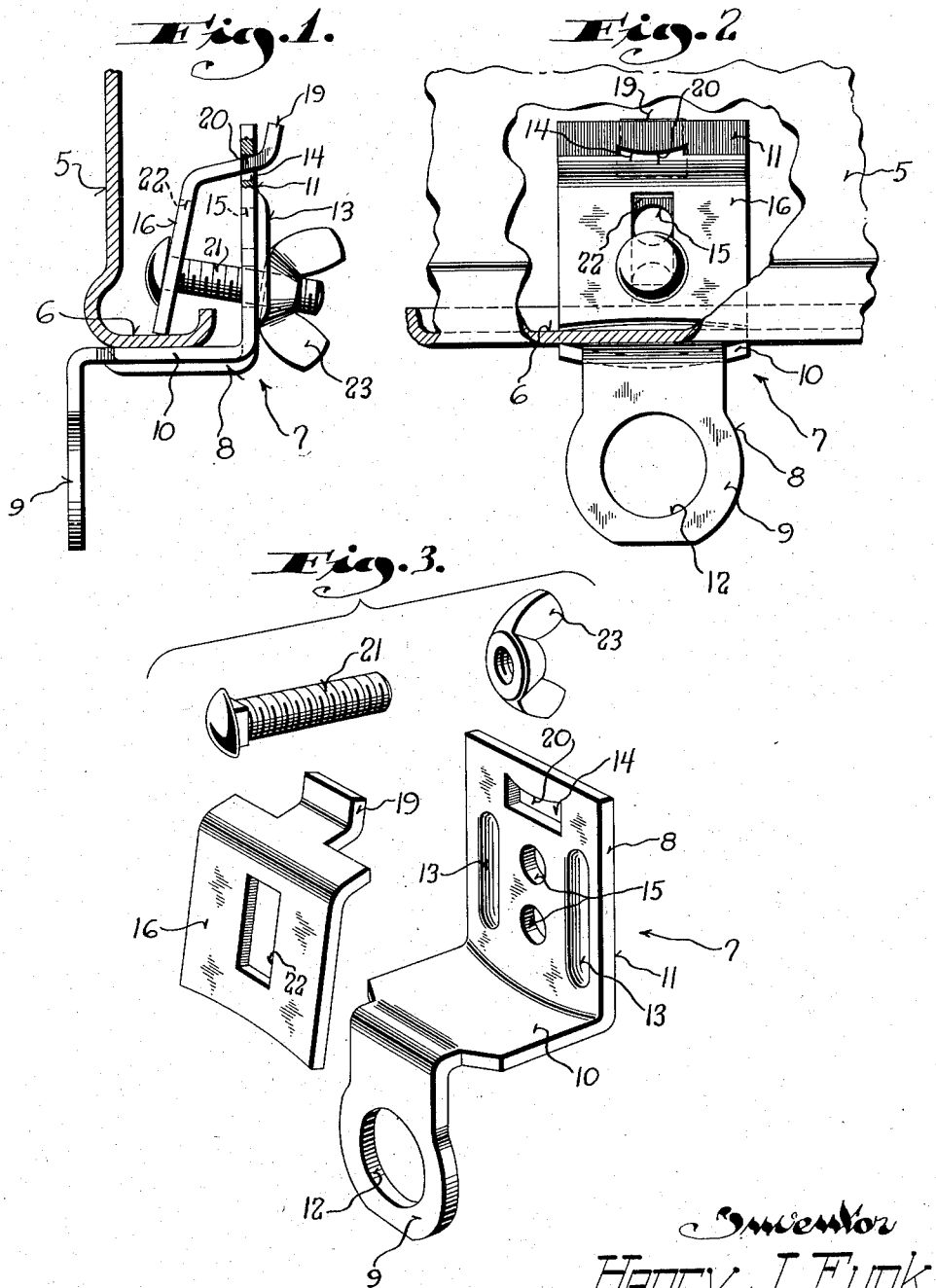

2,080,261

UNITED STATES PATENT OFFICE 2,080,261

MOUNTING BRACKET

Henry J. Funk, Park Ridge, Ill., assignor to Soreng-Manegold Company, Chicago, Ill., a corporation of Illinois Application August 13, 1934, Serial No. 739,624

3 Claims. (Cl. 248—226)

This invention relates to improvements in attaching brackets and refers more particularly to brackets adapted to be clamped to instrument board panels of automobiles.

Heretofore, these brackets have been secured in position generally by the clamping action of a set screw threaded in a portion of the bracket and bearing against the inner surface of the instrument board panel. This method of attaching the bracket imposed severe bending stresses on the bracket and made the security of the grip dependent upon the ability of the bracket to withstand such strain. Consequently, unless the bracket was of heavy clumsy design, the normal vibration of the automobile soon loosened the grip.

It is, therefore, an object of this invention to provide simple and improved means for attaching a bracket of the character described to the instrument board panel of an automobile which does not entail the application of excessive bending strains in any part of the bracket and which will not become loosened by vibration.

More specifically it is an object of this invention to provide a clamp for securing a bracket of the character described to a support, wherein the principle of the toggle lever is employed to obtain an exceptionally strong gripping action.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed according to the best mode so far devised for the practical application of the principles thereof, and in which:

Figure 1 is a cross section view through the conventional instrument board panel illustrating the bracket of this invention applied thereto;

Figure 2 is a front view of the panel and the bracket mounted thereon; and

Figure 3 is a perspective view of the various parts of the device shown separated.

Referring now more particularly to the accompanying drawing, the numeral 5 designates the instrument board panel of an automobile which as is customary has a horizontal flange 6 extending rearwardly along its lower edge.

The mounting bracket of this invention, indicated generally by the numeral 7, is clamped to this rearwardly extending flange 6.

The bracket comprises a body 8 stamped of stiff sheet metal and having three angularly disposed walls 9, 10, and 11. The walls 9 and 11 are parallel so that the body has a stepped shape.

The wall 9 has a hole 12 in which the switch or appliance to be mounted (not shown) is secured, and when the bracket is in position as illustrated in Figure 1, the wall 9 is directly beneath the front of the instrument board so that the switch or appliance mounted thereon is readily accessible.

The upright wall 11 of the body is reinforced against bending by two beads 13 pressed into the same near its opposite sides, and has an elongated opening 14 near its top and two holes 15 centrally located beneath the opening 14.

A plate-like clamping member 16 is pivotally mounted from the upright wall 11 to swing towards the horizontal wall in a clamping action. The pivotal connection between the clamping member and the wall 11 is readily detachable and is conveniently afforded by the engagement of a tongue 19 extended from an angularly disposed portion on the clamping member, into the opening 14. The upper edge 20 of the opening 14 affords a fulcrum about which the clamping member pivots in its clamping action.

A screw 21 having its headed end received in an elongated rectangular opening 22 in the clamping member 16 and its threaded end passed through one of the holes 15, with a wing nut 23 threaded thereon and bearing against the wall 11, provides means for drawing the clamping member rearwardly to effect its clamping action.

As the clamping member is drawn rearwardly, its lower edge, which as illustrated, is concave so that it has a two point contact with the flange 6, bites into the flange. The horizontal wall 10 is also slightly concave as shown, so that it too will have a two point contact with the flange 6 enabling it to seat more firmly.

The concave formation of the wall 10 may be carried to the angle connecting it to the rear wall 11, thereby strengthening the angle against bending stress.

It will be noted that the upper edge 20 of the opening 14 in which the tongue 19 is received is curved to allow the clamping member to rock and adjust itself to any irregularities which might exist in the flange 6 so that both points of its free edge will grip with equal force.

To obtain maximum leverage, the clamping screw 21 is preferably positioned in the lower hole 15, as illustrated, but where the rearwardly directed flange 6 of the instrument board panel has an exceptionally high upstanding bead which would prevent this lowermost location of the screw, it may be inserted in the upper hole 15.

It is particularly noted that only a small part of the clamping force imposes a bending stress on the angle connecting the walls 10 and 11. By far the major portion of the stress imposed on the bracket to afford the clamping action is a tension on the upright wall 11 which of course is easily carried. Consequently, great clamping force may be applied without danger of having the bracket bend. The reinforcing beads 13 preclude inward bending of the wall 11 as a result of the tension applied to the screw.

From the foregoing description taken in connection with the accompanying drawing it will be readily apparent to those skilled in the art to which this invention appertains, that this invention affords an exceptionally simple and highly efficient means for attaching mounting brackets and the like to the instrument board panels of automobiles.

What I claim as my invention is:

1. In a mounting bracket of the character described, a body having angularly disposed walls, one of which has an opening near its outer end, a clamping lever having a tongue extending therefrom into said opening to afford a fulcrumed support for the clamping lever, said clamping lever being of such length that the free end thereof approaches the other angularly disposed wall in a gripping action upon swinging movement of the clamping lever towards the first designated wall, means to draw the clamping lever toward the first designated wall, and the opening in the first designated wall which receives the tongue on the clamping lever being of sufficient size and having its edge on which the tongue bears curved to allow the clamping lever to rock and adjust itself to irregularities in the thickness of the part gripped between its free end and the second designated angularly disposed wall.

2. A mounting bracket of the character described comprising a body having substantially parallel walls connected by a third wall substantially perpendicular to said parallel walls, a rigid one piece lever fulcrumed from one of the parallel walls at a distance from said third wall so as to overlie said parallel wall, said lever being of such length that its free end swings in an arc which intersects the plane of the near side of the third wall to clamp a flange between the free end of the lever and said third wall at a point adjacent the parallel wall from which the lever is fulcrumed upon movement of the lever toward said parallel wall, and means to draw the lever toward said wall to effect the clamping action.

3. A mounting bracket of the character described comprising a body having substantially parallel walls connected by a third wall substantially perpendicular to said parallel walls, a lever having an angularly disposed hooked end portion, a pivotal connection between the hooked end portion of the lever and one of the parallel walls which allows the free end of the lever to swing endwise toward the third wall to clamp a flange between the free end of the lever and said third wall, and means to draw the free end of the lever toward the third wall to effect the clamping action.

HENRY J. FUNK.